United States Patent
Lv et al.

(10) Patent No.: US 10,069,905 B2
(45) Date of Patent: *Sep. 4, 2018

(54) PROMULGATING INFORMATION ON WEBSITES USING SERVERS

(71) Applicant: Alibaba Group Holding Limited, George Town (KY)

(72) Inventors: Kaili Lv, Hangzhou (CN); Jian Deng, Hangzhou (CN); Bingyang Hua, Hangzhou (CN); Zengguang Liu, Hangzhou (CN); Chaofeng Meng, Hangzhou (CN); Jie Su, Hangzhou (CN); Jun Tang, Hangzhou (CN); Zheng Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 18 days.

This patent is subject to a terminal disclaimer.

(21) Appl. No.: 15/185,506

(22) Filed: Jun. 17, 2016

(65) Prior Publication Data

US 2016/0294931 A1 Oct. 6, 2016

Related U.S. Application Data

(63) Continuation of application No. 14/676,135, filed on Apr. 1, 2015, now Pat. No. 9,401,841, which is a
(Continued)

(30) Foreign Application Priority Data

Jun. 6, 2008 (CN) .......................... 2008 1 0110612

(51) Int. Cl.
*H04L 29/08* (2006.01)
*H04L 29/06* (2006.01)
(Continued)

(52) U.S. Cl.
CPC ...... *H04L 67/1002* (2013.01); *G06F 17/3089* (2013.01); *G06F 17/30914* (2013.01);
(Continued)

(58) Field of Classification Search
CPC ..... H04L 67/02; H04L 67/42; H04L 67/1002; H04L 41/0803; G06Q 30/02; G06Q 30/0601; G06F 17/3089; G06F 17/30914
See application file for complete search history.

(56) References Cited

U.S. PATENT DOCUMENTS

| 5,774,551 A | 6/1998 | Wu |
| 5,799,284 A | 8/1998 | Bourquin |

(Continued)

FOREIGN PATENT DOCUMENTS

| CA | 2362467 A1 * | 8/2000 | ............. G06Q 30/02 |
| CN | 101052962 | 10/2007 | |

(Continued)

OTHER PUBLICATIONS

Chinese Office Action dated Aug. 30, 2012 for Chinese Patent Application No. 200810110612.0 a counterpart foreign application of U.S. Appl. No. 12/600,989, 9 pages.

(Continued)

*Primary Examiner* — Kostas Katsikis
(74) *Attorney, Agent, or Firm* — Van Pelt, Yi & James LLP

(57) ABSTRACT

A method uses web servers to promulgate information from one server to another, instead of promulgating the information by the user to each server individually. A first server receives a first request for promulgating web-information from a user, locally promulgates the web-information, and sends a second request to at least one second website server to instruct the second website server to locally promulgate the web-information. The selection of the second server is
(Continued)

done according to a preset configuration file which includes a relationship mapping between the first website server and the second website server. The relationship mapping may provide the user information related to the second website server based on the user information related to the first website server. The present disclosure further discloses a communication apparatus and a communication system.

25 Claims, 3 Drawing Sheets

Related U.S. Application Data continuation of application No. 12/600,989, filed as application No. PCT/US2009/046593 on Jun. 8, 2009, now Pat. No. 9,026,607.

(51) Int. Cl.
  *G06Q 30/06* (2012.01)
  *H04L 12/24* (2006.01)
  *G06F 17/30* (2006.01)
  *G06Q 30/02* (2012.01)

(52) U.S. Cl.
  CPC ......... *G06Q 30/02* (2013.01); *G06Q 30/0601* (2013.01); *H04L 41/0803* (2013.01); *H04L 67/02* (2013.01); *H04L 67/42* (2013.01)

(56) References Cited

U.S. PATENT DOCUMENTS

| | | | |
|---|---|---|---|
| 5,872,850 A | 2/1999 | Klein | |
| 5,978,577 A | 11/1999 | Rierden | |
| 6,070,191 A | 5/2000 | Narendran | |
| 6,253,188 B1 | 6/2001 | Witek | |
| 6,611,861 B1 | 8/2003 | Schairer | |
| 6,625,581 B1* | 9/2003 | Perkowski | G06F 17/30879 |
| | | | 705/14.34 |
| 6,654,807 B2 | 11/2003 | Farber | |
| 6,961,712 B1* | 11/2005 | Perkowski | G06F 17/30879 |
| | | | 705/14.34 |
| 6,999,991 B1 | 2/2006 | Ikeda | |
| 7,100,195 B1 | 8/2006 | Underwood | |
| 7,359,963 B1 | 4/2008 | Huang | |
| 7,620,699 B1 | 11/2009 | Scherer | |
| 7,672,877 B1* | 3/2010 | Acton | G06F 17/3089 |
| | | | 705/26.1 |
| 7,778,870 B1* | 8/2010 | Kriza | G06Q 30/02 |
| | | | 705/14.16 |
| 7,827,298 B2 | 11/2010 | Black | |
| 7,966,369 B1* | 6/2011 | Briere | G06Q 10/10 |
| | | | 707/616 |
| 8,566,248 B1 | 10/2013 | Steele | |
| 8,849,693 B1 | 9/2014 | Koyfman | |
| 9,659,318 B2* | 5/2017 | Tuflija | G06Q 30/06 |
| 2002/0016741 A1* | 2/2002 | Black | G06Q 30/02 |
| | | | 705/26.1 |
| 2002/0046286 A1 | 4/2002 | Caldwell | |
| 2002/0078004 A1 | 6/2002 | Ambrosini | |
| 2002/0128859 A1* | 9/2002 | Perkowski | G06F 17/30876 |
| | | | 705/26.1 |
| 2002/0188520 A1* | 12/2002 | Willner | G06Q 30/02 |
| | | | 705/26.35 |
| 2002/0194081 A1* | 12/2002 | Perkowski | G06F 17/30879 |
| | | | 705/26.1 |
| 2003/0009392 A1* | 1/2003 | Perkowski | G06F 17/30879 |
| | | | 705/14.51 |
| 2003/0069924 A1 | 4/2003 | Peart | |
| 2003/0144924 A1 | 7/2003 | McGee | |
| 2003/0191970 A1 | 10/2003 | Devine | |
| 2003/0212686 A1 | 11/2003 | Chu-Carroll | |
| 2004/0003036 A1* | 1/2004 | Eagle | G06Q 10/00 |
| | | | 709/203 |
| 2004/0054602 A1* | 3/2004 | Ozaki | G06Q 30/0226 |
| | | | 705/26.1 |
| 2004/0111473 A1 | 6/2004 | Lysenko | |
| 2004/0167989 A1 | 8/2004 | Kline | |
| 2004/0210479 A1* | 10/2004 | Perkowski | G06Q 30/02 |
| | | | 705/14.51 |
| 2004/0210771 A1 | 10/2004 | Wood | |
| 2005/0010475 A1* | 1/2005 | Perkowski | G06Q 30/02 |
| | | | 705/14.51 |
| 2005/0024677 A1 | 2/2005 | Miura | |
| 2005/0049939 A1* | 3/2005 | Lai | G06Q 30/02 |
| | | | 705/26.1 |
| 2005/0203807 A1* | 9/2005 | Bezos | G06F 17/30867 |
| | | | 705/14.53 |
| 2005/0209996 A1* | 9/2005 | Stewart | G06F 17/30873 |
| 2005/0246627 A1* | 11/2005 | Sayed | G06F 17/248 |
| | | | 715/234 |
| 2005/0273705 A1* | 12/2005 | McCain | G06F 17/24 |
| | | | 715/234 |
| 2005/0278300 A1 | 12/2005 | Kato | |
| 2005/0278644 A1* | 12/2005 | Greaves | G06Q 30/02 |
| | | | 715/760 |
| 2006/0047547 A1 | 3/2006 | Ekker | |
| 2006/0069623 A1* | 3/2006 | MacDonald Korth | |
| | | | G06Q 30/0601 |
| | | | 705/26.1 |
| 2006/0080183 A1 | 4/2006 | Cicotelli | |
| 2006/0095333 A1 | 5/2006 | Gambhir | |
| 2006/0179111 A1 | 8/2006 | Verona | |
| 2006/0215842 A1 | 9/2006 | Okamoto | |
| 2006/0271689 A1 | 11/2006 | Kikuchi | |
| 2007/0027754 A1 | 2/2007 | Collins | |
| 2007/0027864 A1 | 2/2007 | Collins | |
| 2007/0038673 A1 | 2/2007 | Broussard | |
| 2007/0078772 A1 | 4/2007 | Dadd | |
| 2007/0179835 A1* | 8/2007 | Ott, IV | G06Q 30/02 |
| | | | 705/306 |
| 2007/0180380 A1 | 8/2007 | Khavari | |
| 2007/0185775 A1 | 8/2007 | Lawton | |
| 2007/0185884 A1* | 8/2007 | Kantamneni | G06F 17/3089 |
| 2007/0214075 A1 | 9/2007 | Ablan | |
| 2007/0233565 A1 | 10/2007 | Herzog | |
| 2007/0282694 A1* | 12/2007 | Gould | G06Q 10/087 |
| | | | 705/14.39 |
| 2007/0288595 A1 | 12/2007 | Cohen | |
| 2008/0004992 A1 | 1/2008 | King | |
| 2008/0059297 A1* | 3/2008 | Vallier | G06Q 30/02 |
| | | | 705/14.27 |
| 2008/0082415 A1 | 4/2008 | Shastry | |
| 2008/0091845 A1 | 4/2008 | Mills | |
| 2008/0189617 A1 | 8/2008 | Covell | |
| 2008/0208969 A1 | 8/2008 | Van Riel | |
| 2008/0228595 A1 | 9/2008 | Hill | |
| 2008/0235139 A1 | 9/2008 | Magschok | |
| 2008/0243628 A1* | 10/2008 | Wiseman | G06Q 30/04 |
| | | | 705/26.1 |
| 2008/0313260 A1 | 12/2008 | Sweet | |
| 2009/0099861 A1 | 4/2009 | Aziz | |
| 2009/0112928 A1 | 4/2009 | Hoyt | |
| 2009/0132389 A1* | 5/2009 | Klinger | G06Q 30/02 |
| | | | 705/26.1 |
| 2009/0164884 A1 | 6/2009 | Watson | |
| 2009/0172565 A1* | 7/2009 | Jackson | H04L 67/1095 |
| | | | 715/753 |
| 2009/0198594 A1* | 8/2009 | Lu | G06Q 30/0601 |
| | | | 705/26.1 |
| 2009/0210348 A1* | 8/2009 | Klein | G06Q 20/401 |
| | | | 705/75 |
| 2009/0240629 A1* | 9/2009 | Xie | G06Q 30/02 |
| | | | 705/80 |
| 2009/0254437 A1 | 10/2009 | Lee | |
| 2009/0265257 A1* | 10/2009 | Klinger | G06Q 30/02 |
| | | | 705/26.1 |
| 2009/0271289 A1* | 10/2009 | Klinger | G06Q 30/02 |
| | | | 705/26.1 |

(56) References Cited

U.S. PATENT DOCUMENTS

| | | | |
|---|---|---|---|
| 2009/0282343 A1 | 11/2009 | Catlin | |
| 2009/0299788 A1 | 12/2009 | Huber | |
| 2010/0058160 A1* | 3/2010 | Navarro | G06Q 10/0637 715/208 |
| 2010/0185546 A1 | 7/2010 | Pollard | |
| 2010/0235910 A1* | 9/2010 | Ku | G06F 17/3089 726/22 |
| 2010/0250397 A1* | 9/2010 | Ippolito | G06Q 30/02 705/26.1 |
| 2010/0287062 A1* | 11/2010 | Liang | G06Q 20/12 705/26.1 |
| 2011/0047013 A1* | 2/2011 | McKenzie, III | G06Q 10/10 705/14.4 |
| 2011/0055008 A1* | 3/2011 | Feuerstein | G06Q 30/02 705/14.51 |
| 2011/0066484 A1* | 3/2011 | Cha | G06Q 30/02 705/14.23 |
| 2012/0185339 A1* | 7/2012 | Distefano, III | G06Q 30/02 705/14.69 |

FOREIGN PATENT DOCUMENTS

| | | | |
|---|---|---|---|
| CN | 101148092 | | 3/2008 |
| CN | 101222348 | | 7/2008 |
| GB | 2378775 | | 2/2003 |
| JP | 2001331449 | | 11/2001 |
| JP | 2003030476 | | 1/2003 |
| JP | 2003216513 | | 7/2003 |
| JP | 2003323409 | | 11/2003 |
| JP | 2005234619 | | 9/2005 |
| JP | 2005278195 | | 10/2005 |
| JP | 2005316786 | | 11/2005 |
| JP | 2007036845 | | 2/2007 |
| JP | 2008083803 | | 4/2008 |
| KR | 20000037174 | | 7/2000 |
| KR | 20000053700 A * | 9/2000 | G06Q 10/08 |
| KR | 20010008276 | | 2/2001 |
| KR | 20010071649 | | 7/2001 |
| KR | 20010094145 | | 10/2001 |
| KR | 20030025467 | | 3/2003 |
| KR | 100812045 | | 3/2008 |
| KR | 20090013270 | | 2/2009 |
| KR | 20090079662 | | 7/2009 |
| WO | WO-0231698 | | 4/2002 |
| WO | WO-2006049409 | | 5/2006 |

OTHER PUBLICATIONS

Chinese Office Action dated Jan. 6, 2012 for Chinese Patent Application No. 200810110612.0 a counterpart foreign application of U.S. Appl. No. 12/600,989, 15 pages.

Chinese Office Action dated Mar. 12, 2013 for Chinese Patent Application No. 200810110612.0 a counterpart foreign application of U.S. Appl. No. 12/600,939, 14 pages.

Chinese Office Action dated Sep. 29, 2011 for Chinese Patent Application No. 200810110612.0 a counterpart foreign application of U.S. Appl. No. 12/600,989, 15 pages.

Extended European Search Report dated Jan. 21, 2013 for European patent application No. 09759604.3, 6 pages.

Translated Japanese Office Action dated Dec. 3, 2013 for Japanese patent application No. 2011-512732, a counterpart foreign application of U.S. Appl. No. 12/600,989, 6 pages.

Translated Japanese Office Action dated Jul. 16, 2013 for Japanese patent application No. 2011-512732, a counterpart foreign application of U.S. Appl. No. 12/600,989, 5 pages.

Translated Japanese Office Action dated Mar. 19, 2013 for Japanese patent application No. 2011-512732, a counterpart foreign application of U.S. Appl. No. 12/600,989, 4 pages.

* cited by examiner

PROMULGATING INFORMATION ON WEBSITES USING SERVERS

CROSS REFERENCE TO OTHER APPLICATIONS

This application is a continuation of co-pending U.S. patent application Ser. No. 14/676,135, entitled PROMULGATING INFORMATION ON WEBSITES USING SERVERS filed Apr. 1, 2015 which is incorporated herein by reference for all purposes, which is a continuation of U.S. patent application Ser. No. 12/600,989, now U.S. Pat. No. 9,026,607, entitled PROMULGATING INFORMATION ON WEBSITES USING SERVERS filed Nov. 19, 2009, which is incorporated herein by reference in its entirety for all purposes, and which is a national stage application of international patent application PCT/US09/46593 filed Jun. 8, 2009, entitled "PROMULGATING INFORMATION ON WEBSITE USING SERVERS", which is incorporated herein by reference in its entirety for all purposes, and which claims priority from Chinese Patent Application No. 200810110612.0, filed Jun. 6, 2008, entitled "METHOD, APPARATUS AND SYSTEM FOR PROMULGATING INFORMATION ON WEBSITE", which is incorporated herein by reference in its entirety for all purposes.

TECHNICAL FIELD

The present disclosure relates to fields of communication, and particularly to methods, apparatuses and systems for promulgating information on websites.

BACKGROUND

In existing online marketing process, enterprises generally promulgate company-related information (such as product information) to a number of e-commerce websites with a view to promote purchase interests of the public or collaboration interests of needed providers. As a result, promulgating company-related information to various e-commerce websites to acquire a full information exposure has become an essential procedure in the online marketing process.

However, under existing technologies, if company-related information is promulgated among multiple e-commerce websites, user is required to repeat the same operations on these e-commerce websites in order to complete the promulgation of the company-related information. The redundant operations not only make the process cumbersome, but also greatly reduce the work efficiency of information promulgation.

SUMMARY OF THE DISCLOSURE

Disclosed is a method, an apparatus and a system for promulgating information on website to simplify the process of promulgating the same web-information to multiple website servers.

The method promulgates information from one server to another, instead of promulgating the information from the user to each server individually. A first server receives a first request for promulgating web-information from a user, locally promulgates the web-information, and sends a second request to at least one second website server to instruct the second website servers to locally promulgate the web-information. As a result, to promulgate the same web-information to multiple websites, a user only needs to request promulgation once on the first website server, thus avoiding redundant and cumbersome operations. This significantly improves the efficiency and user experience.

The selection of the second server is done according to a preset configuration file which includes a relationship mapping between the first website server and the second website servers. The relationship mapping may provide the user information related to the second website servers based on the user information related to the first website server. The relationship mapping may contain a mapped correspondence between the user information related to the first website server and the user information related to the second website servers. The related user information may contain a combination of any one or more of user identifier, user password, a device web-address, and a device identifier.

Upon receiving the first request, the first website server may verify the identity of the user based on related user information included in the first request. Upon receiving the second request, the second website servers may also verify the identity of the user based on related user information included in the second request.

The apparatus for promulgating information has a storage unit, a receiving unit, a processor, and a sending unit. The storage unit is adapted for storing a preset configuration file including a relationship mapping between the apparatus and at least one additional promulgating apparatus. The receiving unit is adapted for receiving a first request for promulgating web-information from a user. The processor is adapted for locally promulgating the web-information and for creating a second requests used for instructing the other promulgating apparatus to promulgate the web-information according to the configuration file. The sending unit adapted for sending the second request to the at least one additional promulgating apparatus.

Another aspect of the disclosure is a communication system including a first website server and multiple second website servers. The first website server is adapted for receiving a first request from a user, locally promulgating the web-information, and sending a second request according to a configuration file contained therein. The second website servers are adapted for receiving the second request from the first website server, and locally promulgating the web-information. The first website server selects at least one second website server among the second website servers according to a preset configuration file as recipient of the second request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the use of the same reference numbers in different figures indicates similar or identical items.

DETAILED DESCRIPTION

According to the exemplary embodiments described herein, a method to simplify a user process of promulgating the same web-information to multiple website servers is disclosed. A first website server promulgates the web-information locally upon receiving from a user a first request for promulgating the web-information. According to a preset configuration file, the first website server sends a second request to at least one second website server, and instructs the second website server(s) to locally promulgate the web-information. The configuration file includes a relationship mapping between the first website server and the second website server(s). As a result, to promulgate the same web-information to multiple websites, the user only needs to execute a promulgation operation once, thus avoiding redundant and cumbersome operations. The work efficiency and the user experience are therefore improved.

Exemplary embodiments of the present disclosure are described in details using accompanying figures.

Figure 1:
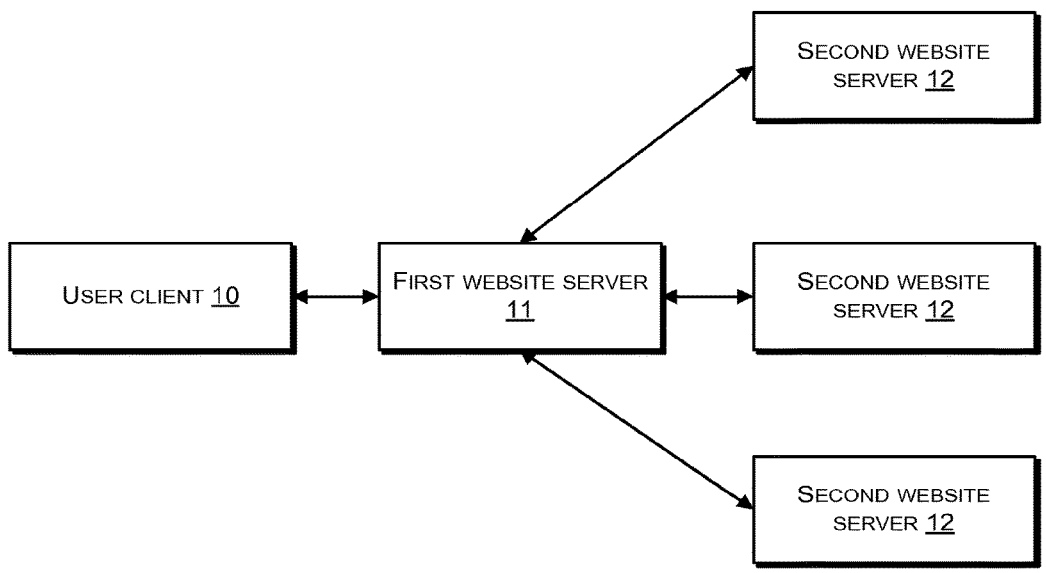
FIG. 1 shows a schematic diagram illustrating architecture of an exemplary communication system in accordance with the present disclosure.

FIG. 1 shows an exemplary communication system 5, which includes a user client 10, a first website server 11, and at least one second website server 12.

The user client 10 is used for sending a first request for promulgating web-information to a first website server 11. The first website server 11 is used for receiving the first request from the user client 10, and locally promulgating the web-information. The first website server 11 is further used for sending a second request to at least one second website server 12 according to a preset configuration file to instruct the second website server(s) to locally promulgate the web-information. The configuration file includes a relationship mapping between the first website server 11 and the second website servers 12.

The second website server 12 is used for receiving the second request from the first website server 11, and locally promulgating the web-information.

In one embodiment, the first website server 11 works as self-contained apparatus for promulgating information. The first website server 11 contains a comprehensive relationship mapping to all desired additional promulgating apparatuses second servers and other web devices that are desired to receive the web-information and promulgate the web-information locally. There is no need for a second server to further promulgate the web-information to other servers requesting further promulgation.

In another embodiment, at least some second website servers 12 are configured as a promulgating apparatus in a way similar to how the first website server 11 is configured. The second website servers 12 configured in this manner are capable of further promulgating the web-information to other servers requesting additional local promulgation or additional networked promulgation.

It is noted that although illustrated as website servers, the first website server 11 may be replaced by a server that does not host a website but is designed for promulgating information to networked website servers (e.g., the second website servers 12). At least some of the second website servers 12 may be replaced by a suitable promulgation apparatus which is not necessarily a website server hosting a website. A suitable promulgation apparatus should generally be a valuable target for promulgating web-information.

Figure 2:
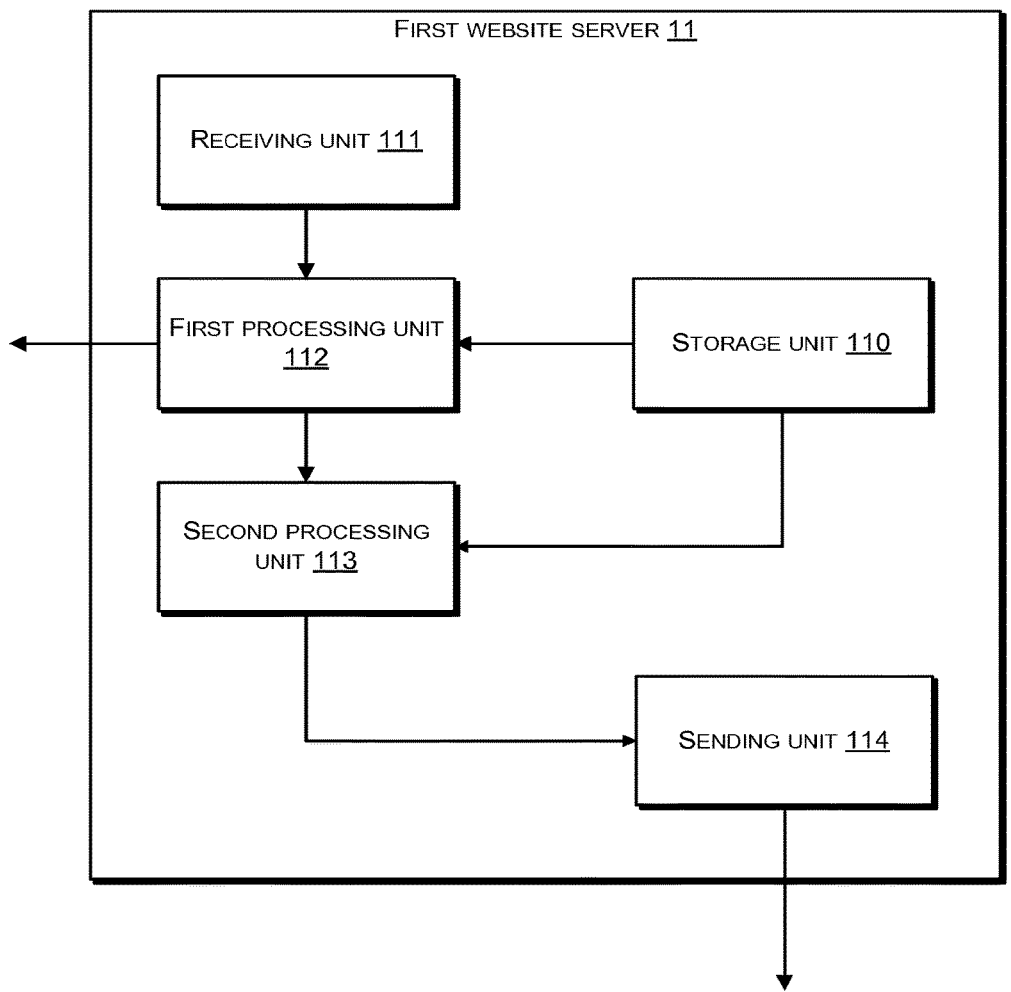
FIG. 2 shows a structural diagram illustrating functions of an exemplary first website server in accordance with the present disclosure.

FIG. 2 shows an exemplary first website server 11, which includes a storage unit 110, a receiving unit 111, a first processing unit 112, a second processing unit 113, and a sending unit 114. In the presence disclosure, a "unit" in general refers to a functionality designed to perform a particular task or function. A unit can be a piece of hardware, software, a plan or scheme, or a combination thereof, for effectuating a purpose associated with the particular task or function. In certain circumstances, multiple units may be embodied in a single hardware or software component which performs multiple functions.

The storage unit 110 is used for storing a preset configuration file, which includes relationship mapping between the first website server 11 and the second website servers 12. The relationship mapping contains a map correspondence between the user information related to the first website server and the user information related to the second website server.

The receiving unit 111 is used for receiving a first request for promulgating web-information from the user client 10. The first processing unit 112 is used for locally promulgating the web-information. The second processing unit 113 is used for creating at least one second request according to the configuration file. The second request is used for instructing the second website servers 12 to promulgate the web-information. The sending unit 114 is used for sending the second request to the second website servers 12.

Based on the above system architecture, the first website server 11 and the second website servers 12 may either have the same functionalities, or have different functionalities. In the exemplary embodiments, the first website server 11 is assumed to be a website server within a company's intranet, while the other second website servers 12 are public website servers (i.e., e-commerce web sites).

Figure 3:
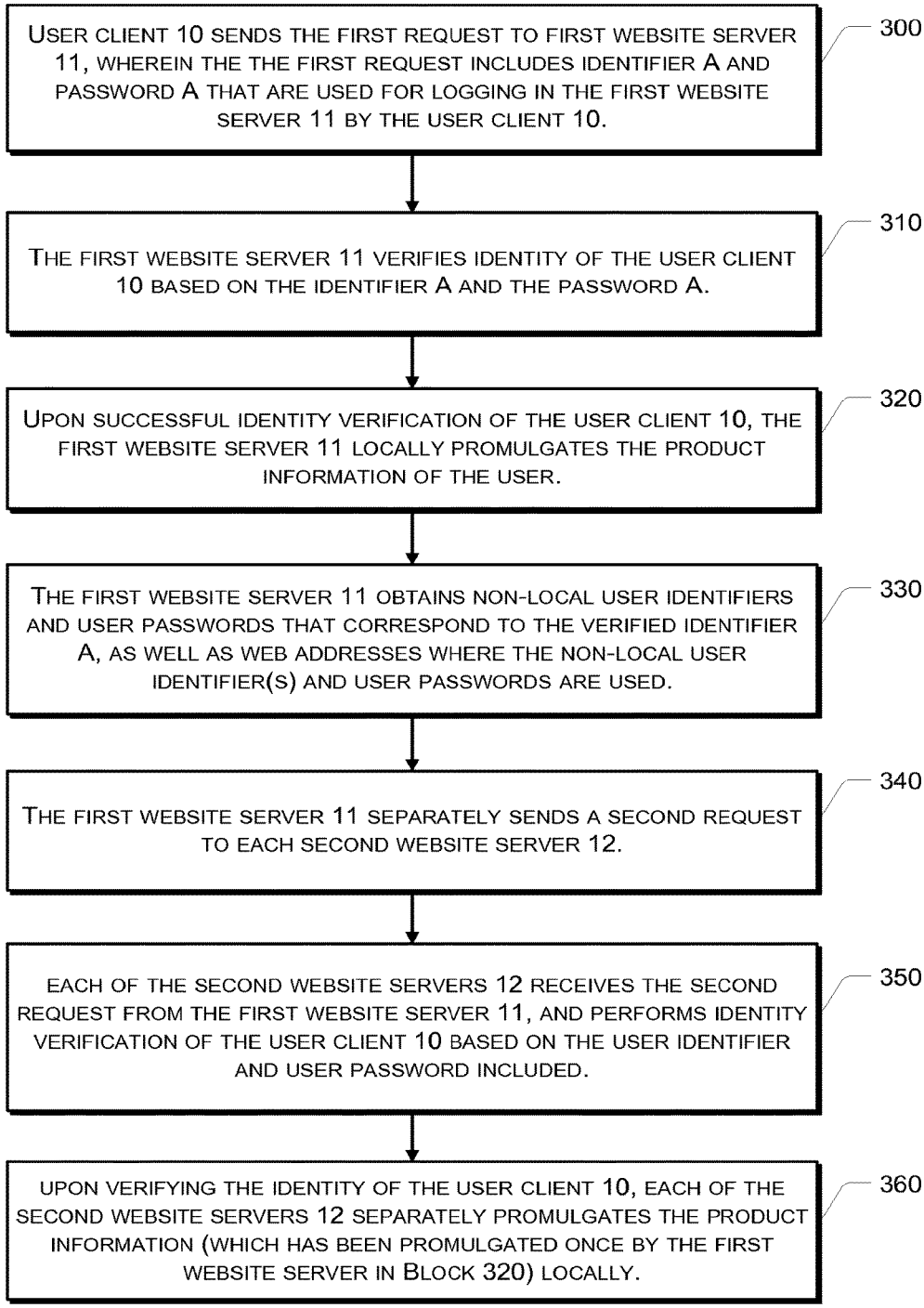
FIG. 3 shows a flow chart illustrating promulgating web-information by a user in accordance with the exemplary embodiments of the present disclosure.

FIG. 3 is a flowchart of an exemplary process 30 of promulgating the same web-information to multiple second website servers 12 through the first website server 11. In this description, the order in which a process is described is not intended to be construed as a limitation, and any number of the described process blocks may be combined in any order to implement the method, or an alternate method. The process 30 is described as follows.

At Block 300, the user client 10 sends a first request to the first website server 11 to instruct the first website server 11 to locally promulgate certain web-information. The first request includes related user information that is used for the first website server 11 to verify the identity of the user using the user client 10.

The user client 10 may further include in the first request the web-information that is instructed to be promulgated. Alternatively, the user client 10 may send the web-information separately after receiving a feedback confirming successful identity verification from the first website server 11. In the present exemplary embodiment, the first approach is used for illustration.

In a practical application, various forms of the related user information can be used by the user client 10 for identity verification. Examples include user identifier+user password, IP address of the user client 10, and device identifier of the user client 10. In the present exemplary embodiment, user identifier+user password is used by the user client 10 as the related user information.

In the following, it is assumed that the user client 10 has an Identifier A and a Password A with relation to the first website server 11. That is, in the first website server 11, the local identifier and the local password of user client 10 is Identifier A and Password A, respectively.

As shown in TABLE 1, the first website server 11 may store multiple user identifiers and corresponding user passwords for identity verification. Different user identifiers and user passwords are used to identify different individual users.

TABLE 1

| Local User Identifier | Local User Password |
| --- | --- |
| Identifier A | Password A |
| Identifier B | Password B |
| ... | ... |

At Block 310, the first website server 11 verifies the identity of the user client 10 based on Identifier A and Password A.

In a practical application, if no identity verification is required for promulgation of web-information in the first website server 11, verification procedures in Blocks 300 and 310 may be omitted.

At Block 320, upon successfully verifying the identity of the user client 10, the first web site server 11 locally promulgates the web-information as requested by the user client 10. For the purpose of illustration, in this exemplary embodiment, the web-information that is requested for promulgation by the user client 10 is assumed to be information of outdoor product supplies.

The first website server 11 may promulgate the information of outdoor product supplies in a number of ways. Examples include, but are not limited to, fixed-point play on a web page using FLASH advertising, or publishing on a separate or dedicated web page.

Upon promulgating the information of outdoor product supplies, the first website server 11 may save the information locally or in a designated storage device for backup information. Alternatively, the first website server 11 may delete the information for saving storage space. Specific processing procedures may be pre-determined by the management according to a practical application environment.

At Block 330, the first website server 11 obtains from the relationship mapping non-local user identifiers and non-local user passwords corresponding to the local Identifier A, and web addresses of the places where respective non-local user identifiers and non-local user passwords are used. In this exemplary embodiment, a place where a non-local user identifier and a non-local user password are used refers to one of the second website servers 12.

For example, as shown in TABLE 2, Identifier A, Identifier C, and Identifier D are non-local user identifiers that correspond to the Identifier A. It is noted that the Identifier A may also be used the nonlocal identifier of the same user in other non-local servers. If the same user identifier is used both locally and non-locally, either the same user password or different user passwords may be used for the user identifier locally and non-locally.

TABLE 2

| Local User Identifier | Non-local User Identifier | Non-local User Password | Second Website Server Address |
| --- | --- | --- | --- |
| Identifier A | Identifier A | Password A' | Address A |
|  | Identifier C | Password C | Address B |
|  | Identifier D | Password D | Address C |
|  | ... | ... | ... |
| Identifier B | Identifier E | Password E | Address D |
| ... | ... | ... | ... |

As shown in TABLE 2, the Identifier A corresponds to at least three second website servers 12 in this exemplary embodiment. This means that the user identified by the Identifier A on the first website server 11 has a business relationship with (e.g., having a user account) at least three second website servers 12. Therefore, the user may intend to promulgate the same product information on these second website servers 12 as well. In other words, the information of outdoor product supplies of the user client 10, which is promulgated on the first website server 11, needs to be also promulgated on these three second website servers 12.

At Block 340, the first website server 11 sends a second request to each of these three or more second website servers 12 instructing local promulgation of the information of outdoor product supplies. The same information has been promulgated in Block 320.

Depending on the non-local user information, the second request sent to different second website servers 12 may contain different identification information. In the present exemplary embodiment, for example, the second request sent to each of the three second servers 12 includes "identifier A and password A", "identifier C and password C", or "identifier D and password D", respectively.

With reference to Block 300, the first website server 11 may include the information of outdoor product supplies in the second request and send the information along with the second request to the second website servers 12. Alternatively, the first website server 11 may separately send the information of outdoor product supplies after the first website server 11 has received a feedback confirming successful identity verification from the second website server 12. In this exemplary embodiment, the first approach is used for illustration.

At Block 350, each of the second website servers 12 receives the respective second request from the first website server 11, and performs identity verification of the user client 10 based on respective user identifier and user password included in the second request.

At Block 360, upon verifying the identity of the user client 10, each of the second website servers 12 separately promulgates the information of outdoor product supplies locally. The same information has been promulgated in Block 320.

Similar to that in Block 320, upon promulgating the information of outdoor product supplies, the second website server 12 may save the information locally or in a designated storage device for backup information. Alternatively, the second website server 12 may delete the information for saving up storage space. Specific details are not repeated.

In a practical application, if no identity verification is required for promulgation of web-information in any of the second website servers 12, the respective verification procedures in Blocks 350 and 360 may be omitted.

In the above exemplary embodiment, the methods of identity verification in the first website server 11 and the second website servers 12 may or may not be the same. For example, "user identifier+user password" may be used for identity verification in the first website server 11 while "device identifier" is used in any of the second website servers 12. Evidently, the same or different identity verification methods may be used among the second website servers 12. Specific details are not repeated here again.

In a practical application, the first website server 11 and the second website servers 12 in foregoing exemplary embodiments may have the same or similar functionalities, but may also be different in various aspects. For example, both the first website server 11 and the second website server 12 may be public website servers. The user client 10 may promulgate the web-information in one of the website servers to trigger the website server to instruct other website servers (with which the user client 10 has registered) to locally promulgate the same web-information separately.

The foregoing Blocks 300-360 assumes for the purpose of illustration that the first website server 11 is a company internal website server and the second website servers 12 are public website servers or website servers of other companies. If both the first and the second website servers are public website servers, procedures are similar to the above and will not be described here again.

As indicated above, the first website server has a desired configuration file containing the necessary relationship mapping that relates a user registered with the first website server to the second website servers. As long as the relationship mapping is sufficiently complete, there may be no need for further promulgation from the second website servers to any subsequent layers of website servers (e.g., third website servers). Nevertheless, in principle, multiple layer promulgation is possible given proper considerations to server selectivity from one layer to the other (e.g., implementation of rules that prevent backward promulgation of information from a website server to any website server that has already performed local promulgation of the same information).

On the other hand, the first website server 11 may send the second requests only to selected second website servers 12 based on the content of web-information. For example, the web-information may be that of a product of certain type. Users may have a variety of web-information for various types of products. The web-information of a certain type of products may be sent to a subset of second website servers that are particularly suited for promulgating the web-information of this type of products.

An example definition of information types is shown in Table 3.

TABLE 3

| Information Type | Information Content |
|---|---|
| Type X | Kitchen Products |
| Type Y | Sanitary and Bath Products |
| Type Z | Outdoor Products |
| ... | ... |

According to TABLE 3, if the first website server 11 receives a request containing a type identifier "Y" from the user client 10, the first website server 11 may selectively send out the second request to related second website servers 12 according to configuration information that is shown in Table 4:

TABLE 4

| Information Type | Related User Information | Web Address |
|---|---|---|
| Type X | Identifier A/Password A | Address A |
|  | Identifier B/Password B | Address B |
|  | ... | ... |
| Type Y | Identifier C/Password C | Address C |
| Type Z | Identifier D/Password D | Address D |
| ... | ... | ... |

According to the above TABLE 4, Type Y products are suited for information promulgation on a website identified by "Address C". The first website server therefore sends the second request to a second server hosting the website identified by "Address C". The second request may include the related non-local user information Identifier C/Password C associated with website. Each product type may correspond to multiple websites.

In conclusion, in the exemplary embodiments of the present disclosure, the first website server 11 receives a first request for promulgating web-information from the user client 10, and promulgates the web-information locally. The first website server 11 further sends a second request to at least one second website server 12 and instructs the second website server(s) to locally promulgate the web-information according to a preset configuration file. As a result, to promulgate the same web-information to multiple websites, the user only needs to execute the promulgation operation once, thus avoiding redundant and cumbersome operations. The work efficiency and the user experience are therefore greatly improved.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:
receiving, by a first server, a first request to promulgate web-information to a plurality of second servers, wherein the plurality of second servers are associated with a plurality of e-commerce websites, and wherein the first request comprises a first account identifier for a first account for the first server; and
in response to receiving the first request:
selecting, by the first server, the plurality of second servers to which to promulgate web-information;
configuring, by the first server, a plurality of second requests to promulgate the web-information to the selected plurality of second servers, configuration of the plurality of second requests being based at least in part on the first request and a mapping between the first server and the plurality of second servers, the mapping between the first server and the second servers includes a mapping of first account information for the first server to second account information for the plurality of second servers, and the configuration of the plurality of second requests being based at least in part on the mapping of the first account identifier to the second account information; and
respectively sending, by the first server, the plurality of second requests to promulgate the web-information to the corresponding plurality of second servers.

2. The method of claim 1, wherein each of the plurality of second requests are configured according to a mapping of account information associated with the plurality of second servers to corresponding ones of the plurality of second servers, and the account information is related to an account associated with the first request.

3. The method of claim 2, wherein the mapping of the account information associated with the plurality of second servers to the corresponding ones of the plurality of second servers is stored in a configuration file.

4. The method of claim 1, wherein the first request is associated with information corresponding to a product type, and the plurality of second servers is selected based at least in part on the product type.

5. The method of claim 4, wherein the information corresponding to the product type associated with the first request is included in the first request.

6. The method of claim 1, wherein the plurality of second servers is selected based at least in part on an account information communicated to the first server in connection with the first request, and the account information corresponds to an account registered with the first server.

7. The method of claim 6, wherein the account information is included in the first request.

8. The method of claim 1, wherein one or more of the plurality of second requests is communicated to a respective second server using a first message that includes corresponding account information and a second message that includes the web-information.

9. The method claim 1, wherein in response to respectively receiving a corresponding second request among the plurality of second requests, a second server sends a request to a respective third server to promulgate the web-information.

10. The method of claim 1, wherein the plurality of second servers is selected based at least in part on an information type of the web-information.

11. The method of claim 10, wherein the first server selects the plurality of second servers according to a type identifier of the web-information.

12. The method of claim 1, further comprising:
in receiving the first request, verifying, by the first server, an identity of a user based on related user information included in the first request.

13. The method of claim 12, wherein the related user information comprises a combination of any one or more of: a user identifier, a user password, a device web-address, or a device identifier.

14. The method of claim 1, further comprising:
in response to respectively receiving the second request, verifying, by the respective second server, an identity of a user based on related user information included in the second request.

15. The method of claim 1, wherein each of the plurality of second requests are configured according to a mapping of account information associated with the plurality of second servers, the account information is related to an account associated with the first request, and the mapping includes a map correspondence between user information related to the first server and user information related to one or more of the plurality of second servers.

16. The method of claim 1, further comprising:
storing, by the first server, one or more configuration files, wherein the one or more configuration files includes a mapping of account information associated with the plurality of second servers to corresponding ones of the plurality of second servers, and the account information, and the account information is related to an account associated with the first request.

17. The method of claim 1, wherein the mapping between the first server and the plurality of second servers includes a mapping of product types to the plurality of second servers, the first request comprises information associated with a product type, and wherein the selection of the plurality of second servers is based at least in part on the information associated with the product type.

18. A device comprising:
one or more processors configured to:
receive, from a client, a first request, wherein the first request comprises a first account identifier for a first account for the first server; and
in response to receiving the first request:
selecting, by a first server, a plurality of second servers to which to promulgate web-information, wherein the first request corresponds to a first request to promulgate web-information to the plurality of second servers, and the plurality of second servers are associated with a plurality of e-commerce websites;
configure a plurality of second requests to promulgate the web-information to the selected plurality of second servers, configuration of the plurality of second requests being based at least in part on the first request and a mapping between the first server and the plurality of second servers, the mapping between the first server and the second servers includes a mapping of first account information for the first server to second account information for the plurality of second servers, and the configuration of the plurality of second requests being based at least in part on the mapping of the first account identifier to the second account information; and
respectively send, the plurality of second requests to promulgate the web-information to the corresponding plurality of second servers; and
a storage module configured to store information associated with the plurality of servers and the web-information.

19. The device of claim 18, wherein each of the plurality of second requests are configured according to a mapping of account information associated with the plurality of second servers to corresponding ones of the plurality of second servers, and the account information is related to an account associated with the first request.

20. The device of claim 18, wherein the first request is associated with information corresponding to a product type, and the plurality of second servers is selected based at least in part on the product type.

21. The device of claim 20, wherein the information corresponding to the product type associated with the first request is included in the first request.

22. The device of claim 18, wherein the plurality of second servers is selected based at least in part on an account information communicated to the first server in connection with the first request, and the account information corresponds to an account registered with the first server.

23. The device of claim 22, wherein the account information is included in the first request.

24. The device of claim 19, wherein the mapping of the account information associated with the plurality of second servers to the corresponding ones of the plurality of second servers is stored in a configuration file.

25. A computer program product embodied in a tangible non-transitory computer-readable storage medium and comprising computer instructions for:
receiving, by a first server, a first request to promulgate web-information to a plurality of second servers, wherein the plurality of second servers are associated with a plurality of e-commerce websites, and wherein the first request comprises a first account identifier for a first account for the first server; and
in response to receiving the first request:
selecting, by the first server, a plurality of second servers to which to promulgate web-information;
configuring, by the first server, a plurality of second requests to promulgate the web-information to the selected plurality of second web servers, configuration of the plurality of second requests being based at least in part on the first request and a mapping between the first server and the plurality of second servers, the mapping between the first server and the second servers includes a mapping of first account information for the first server to second account information for the plurality of second servers, and the configuration of the plurality of second requests being based at least in part on the mapping of the first account identifier to the second account information; and respectively sending, by the first server, the plurality of second requests to promulgate the web-information to the corresponding plurality of second servers.

* * * * *